United States Patent Office 3,447,916
Patented June 3, 1969

3,447,916
ACYLATED POLYESTERS, POLYESTER-AMIDES, OR POLYAMIDES
Alan H. Edwards, Didcot, Berkshire, England, assignor to Esso Research and Engineering Company, a corporation of Delaware
No Drawing. Filed Nov. 2, 1966, Ser. No. 591,419
Claims priority, application Great Britain, Nov. 10, 1965, 47,735/65
Int. Cl. C10l 1/22, 1/18
U.S. Cl. 44—62                13 Claims

ABSTRACT OF THE DISCLOSURE

This invention relates to acylated polyesters, polyester-amides or polyamides which are particularly suitable as pour point depressants when added to hydrocarbons, such as fuel oils.

---

According to this invention acylated polyesters, polyester-amides, or polyamides (hereinafter referred to as polymers) are obtained by the reaction of (1) a dicarboxylic acid, anhydride, or ester thereof wherein there is a $C_{18}$ to $C_{44}$ hydrocarbyl group attached to the carbon chain linking the two carboxyl, or carbonyl, groups of the acid, anhydride or ester, with (2) an alcohol, amine, or hydroxy amine, each having three or more hydroxy and or amino groups, and (3) a monobasic acid; provided that if there are only two or three carbon atoms in the carbon chain linking the carbonyl groups of the di-carboxylic acid, anhydride, or ester, any amino group in component (2) must be a secondary amine group. In both polymerisation reactions component (3) acylates the product obtained by the reaction of components (1) and (2).

The polymers of the invention derived from a monobasic acid include those represented by the general formulae:

(1)
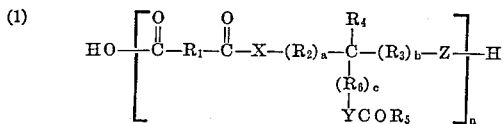

or where the polymer is derived from a hydroxy amine of the formula

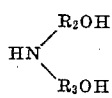

(2)
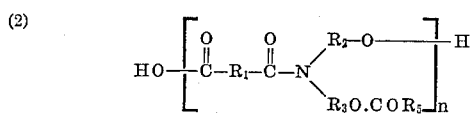

or (3)
$$HO\left[\begin{matrix}O & O & \\ \| & \| & \\ C-R_1-C-OR_2-N-R_3-O \\ & & | \\ & & COR_5\end{matrix}\right]_n H$$

(4)
$$HO\left[\begin{matrix}O & O & \\ \| & \| & \\ C-R_1-C-OR_2-N \\ & & | \\ & & R_3O.COR_5\end{matrix}\right] H$$

or where the polyester amide is derived from a hydroxy amine of the formula

(5)
$$HO\left[\begin{matrix}O & O & \\ \| & \| & \\ C-R_1-C-OR_2-N-R_3-O \\ & & | \\ & & R_7O.COR_5\end{matrix}\right]_n H$$

or where the polymer is derived from an amine or hydroxyamine containing at least one primary amino group.

(6)
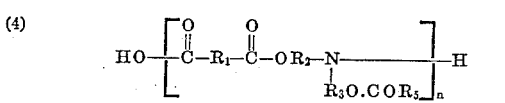

wherein $R_1$ is a $C_{19}$ to $C_{44}$ hydrocarbyl substituted alkylene group, and $R_2$, $R_3$, $R_6$ and $R_7$ are similar or dissimilar alkylene or hydrocarbyl substituted alkylene groups;

X, Y and Z are similar or dissimilar and either an oxygen atom or the group >NR wherein R is a hydrocarbyl group;

$X_1$, $Y_1$ and $Z_1$ are an oxygen atom or the groups >NR or >NH provided at least one of the groups $X_1$, $Y_1$, and $Z_1$ is an >NH group, R being a hydrocarbyl group;

$R_1'$, $R_1''$ and $R_4$ are hydrogen atoms or hydrocarbyl groups, provided at least one of $R_1'$ and $R_1''$ is a $C_{18}$ to $C_{44}$ hydrocarbyl group;

$R_5$ is a hydrocarbyl group;

a, b and c are zero or one provided that not more than one of a, b, or c is zero;

n is an integer, and p and q are zero or integers provided that p plus q is one or at least four.

If the polymers are derived from esters of dicarboxylic acids the formulae are similar to those given above, except that the group —OH outside the square brackets is replaced by the group —$OR_8$ where $R_8$ is a hydrocarbyl group, preferably a $C_1$ to $C_5$ alkyl group.

It will be recognised that the above formulae represent average structures and by normal statistical considerations some of the polymer molecules will be terminated with only carboxyl groups, hydroxyl groups, —$OR_8$ groups (if derived from diesters), or amino groups.

The dibasic acids and anhydrides from which the polymers are derived are those of the general formula

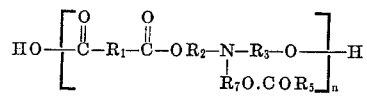

and

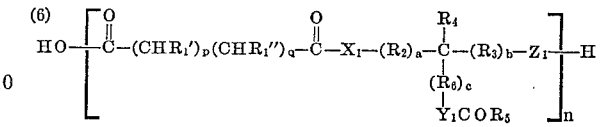

where $R_1$ is a hydrocarbyl substituted alkylene radical e.g. —$(CH_2)_x$—$CHR_1'$—, where x is an integer, and $R_1'$, $R_1''$, p and q are as defined previously. It preferable that the integer x be fairly low, e.g. 1 to 5, especially equal to 1, so that the acid or anhydride is a hydrocarbyl substituted succinic acid or anhydride.

The hydrocarbyl group substituent is preferably an alkenyl group, but may be an alkyl group, or an alkenyl group. Generally for the resulting polymer to have good pour point potency it is preferable if the hydrocarbyl group substituent is a straight chain radical. The chain length of the hydrocarbyl substituent group is preferably between 20 and 40 e.g. about 30 carbon atoms or an average of about 30 carbon atoms, especially when the polymer is used as a pour depresseant in heavy fuels i.e. those which have kinematic viscosities in excess of 15 cs. at 100° F. and preferably where at least 60% by weight boils above 500° F. at atmospheric pressure. Thus, suitable dibasic acid anhydrides wherein x is 1 and $R_1'$ is an alkenyl group, can be made by the reaction of a normal alpha olefin with maleic anhydride. Instead of an acid or anhydride the corresponding esters can be used, and those especially suitable are the ester derived from a low boiling alcohol, e.g. a $C_1$ to $C_5$ aliphatic alcohol, such as methanol, ethanol or isopropanol.

The alcohol having three or more hydroxy groups is preferably a triol, although tetrols, pentols, and higher could be used. The alcohol is usually an aliphatic alcohol, although if desired aromatic alcohols could be used. The aliphatic triols may be represented by the formula

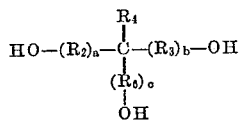

wherein $R_2$, $R_3$, $R_4$ and $R_6$, $a$, $b$ and $c$ are as defined above. Preferably the groups $R_2$, $R_3$ and $R_6$ are unsubstituted alkylene groups and preferably each group contains between 1 and 10 carbon atoms, especially 1 to 5 carbon atoms. If the groups $R_2$, $R_3$, and $R_6$ are themselves substituted with one or more hydrocarbyl groups these substituent hydrocarbyl groups are preferably aliphatic groups, e.g. alkyl groups containing 1 to 20 carbon atoms, for instance methyl, propyl or hexyl groups.

The group $R_4$ may be an alkyl group containing 1 to 10 carbon atoms e.g. an ethyl, butyl or decyl group. However it is preferable if the group $R_4$ is a hydrogen atom Triols where in the above formula $c$ is zero are particularly suitable.

The preferred aliphatic is glycerol.

The secondary amine having three or more secondary amino groups may in the case where these are three secondary amine groups be represented by the formula

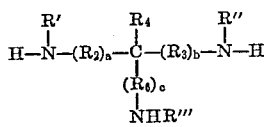

where the groups $R_2$, $R_3$, $R_4$, and $R_6$, and $a$, $b$ and $c$ are as defined above.

The groups $R'$, $R''$ and $R'''$ may be similar or dissimilar hydrocarbyl groups. Suitable and preferred examples of the groups $R_2$, $R_3$, $R_4$ and $R_6$ are the same as those given in connection with the aliphatic triol. The groups $R'$, $R''$ and $R'''$ are preferably alkyl groups, e.g. those having between 1 and 20 carbon atoms, for example methyl, ethyl, butyl, hexyl or decyl. They may however be other hydrocarbyl groups, such as aryl, e.g. phenyl, or aralkyl, e.g. benzyl groups.

Examples of suitable secondary amines are 1,2,3, tri(methylamino) propane: 1-methyl amino, 2-propyl amino: 4-methyl amino butane.

The hydroxyamines having three or more hydroxy or secondary amines may be a hydroxyamine where both hydroxy and secondary amino groups are present, e.g. those represented by the formulae

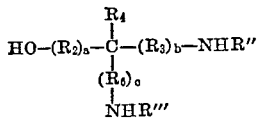

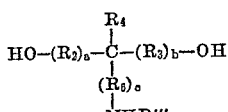

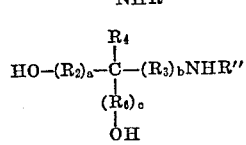

and

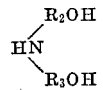

wherein the groups $R_2$, $R_3$, $R_4$, $R_6$, $R''$ and $R'''$ and $a$, $b$ and $c$ are as defined previously. Suitable and preferred examples of the groups $R_2$, $R_3$, $R_4$, $R_6$, $R''$ and $R'''$ are the same as those given in connection with the secondary amine. Particularly preferred hydroxy secondary amines are those of the formula

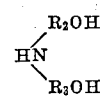

for example diethanolamine, and dipropanolamine.

Also suitable hydroxyamines are trialkanolamines which may be represented by the formula

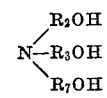

where $R_2$, $R_3$ and $R_7$ are similar or dissimilar alkylene or hydrocarbyl substituted alkylene groups. Suitable and preferred examples of the groups $R_2$, $R_3$ and $R_7$ are as given previously for the groups $R_2$ and $R_3$. Particularly preferred trialkanolamines are triethanolamine, and tripropanolamine.

The amine or hydroxyamine containing at least one primary amino group may be represented by the formula

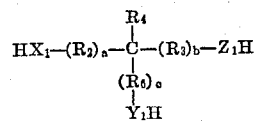

wherein $R_2$, $R_3$, $R_4$, $R_6$, $X_1$, $Y_1$, $Z_1$, $a$, $b$, and $c$ are as defined previously. Suitable and preferred examples of the groups $R_2$, $R_3$, $R_4$ and $R_6$ are the same as those given previously in connection with the aliphatic triol. Thus, all the groups $X_1$, $Y_1$, and $Z_1$ may be $>NH$ in which case the compound is a tri primary amine, e.g., 1,2,3, triamino propane; 1,2,4, triamino butane; or 1,3 diamino 2-(amino methyl) propane. Alternatively two of the groups $X_1$, $Y_1$ and $Z_1$ could be hydroxy groups, giving compounds as for example 2-amino propylene glycol, 2-(amino methyl) butylene glycol. As another alternative one could use compounds where two of the groups $X_1$, $Y_1$, and $Z_1$ are primary amino and the third of said groups is a secondary amino group, for example 2-(methyl amino) propylene diamine, or 2-(N-methyl amino propyl) butylene diamine. It is appreciated that there are many other compounds possible where at least one of the groups $X_1$, $Y_1$, and $Z_1$ is primary amino and the other of said groups are secondary amino, or hydroxy.

The monobasic acid of the formula $R_5COOH$ is preferably an acid wherein $R_5$ is an alkyl group, preferably containing from 12 to 30 carbon atoms, e.g. octadecyl. The group $R_5$ is also preferably straight-chained. However acids where $R_5$ is an alkenyl, alkaryl, aryl, or aralkyl group may be used. Examples of suitable acids are dodecanoic acid, heptadecanoic acid, eicosanoic acid, tetracosanoic acid, triacontanoic acid, benzoic acid, and phenyl acetic acid. Alternatively mixtures of monocarboxylic acids may be used e.g. a mixture of $C_{12}$ and $C_{14}$ acids.

In order to prepare the polymer, the three components i.e. (1), (2) and (3) are reacted with one another. Preferably the three components are reacted in equimolar quantities but small variations from equimolar quantities can readily be used, e.g. 0.8 to 1.2 moles of (1) reacted with 0.8 to 1.2 moles of (2) and 0.8 to 1.2 moles of (3).

The molecular weight of the polyesters and polyester-amides should preferably be more than 1000, for example between 1200 and 5000. This means that for typical polymers where one of the above mentioned preferred compounds are used, when reacting (1), (2) and (3), the integer $n$ is between 2 and 6, for example an average of 4.

When acids or esters are used as component (1), and $n$ moles of (1) are reacted with $n$ moles of (2) and $n$ moles of (3); then for each mole of polyester produced $(3n-1)$ moles of water in the case of acids, or alcohol in the case of esters will be produced. If anhydrides are used as component (1) then when the number of moles of each monomer is $n$, only $(2n-1)$ moles of water will be produced.

The molecular weight of the polymer can be controlled by the amount of water or alcohol which is removed during the polymerisation reaction. Thus, for a polymer having an average of 4 units, i.e. $n=4$, if 4 moles of dibasic acid or ester are reacted with 4 moles of (2) and 4 moles of (3), 11 moles i.e. $(3n-1)$ moles of water or alcohol should be removed. If dibasic anhydride be used instead of the acid or ester, then in similar circumstances only 7 moles, i.e. $(2n-1)$ moles of water should be removed. Thus, the chain length of the polymer may be controlled by the amount of water or alcohol which is removed. For a polymer of longer chain length, more water or alcohol should be driven off, i.e. the reaction should be carried out for a longer period of time and/or at a higher temperature.

The polymers may be prepared by heating the three components (1), (2) and (3) together at a temperature between 100° and 300° C., for example about 200° C. The polymerisation reaction should preferably be carried out for between about 2 and 20 hours, for example about 14 hours.

Alternatively, the three components (1), (2) and (3) may be refluxed together in a solvent, e.g. xylene, toluene, benzene or heptane, in the presence of a catalyst such as p-toluene sulphonic acid, or sulphuric acid. The presence of a catalyst is not necessary if component (2) contains only amino groups. The reaction time should also be between about 2 and 20 hours. The water of reaction is removed by azeotropic distillation.

As another alternative the reaction may be carried out in a two stage process, reacting first components (1) and (2), and then reacting the product so obtained with component (3). In this case also, solvent and catalyst may be used in each stage of the reaction if desired, and the same examples of catalyst and solvent are applicable.

After the reaction has been completed, the polymer is removed from the reaction mixture by, for example stripping off solvent under reduced pressure.

The polymers of the invention are particularly suitable for use as pour point depressants in lubricating oils and fuels. Thus, the polymers of the invention may be added to paraffinic, napthenic, or mixed based mineral lubricating oils. In such cases the polymer is used in a concentration ranging for example from 0.001% to 10.0% by weight, especially 0.05% to 5.0%: e.g. about 0.1% by weight based on the oil. Alternatively the polymers of the invention may be used preferably in the same quantities in lighter liquid hydrocarbons, e.g. distillate fuels such as diesel fuel base stocks, domestic heating oils, mineral seal oil, or refined kerosene. The polymers are particularly suitable for use in relatively heavy fuels; i.e. those fuels which have a kinematic viscosity in excess of 15 cs. at 100° F., and preferably where at least 60% by weight of the fuel boils above 500° F. at atmospheric pressure. Examples of such fuels are fuel oils consisting largely or entirely of the residue from the distillation of crude oil and these generally have viscosities ranging from 15 to 3000 cs. at 100° F. The polymer is blended in the fuel, preferably in a proportion between 0.001% and 10.0% by weight, especially between 0.01% and 1.0% e.g. 0.3% by weight, based on the fuel.

The invention is now described with reference to the following examples.

Example I

Succinic anhydride having a mixture of $C_{18}$ to $C_{44}$ alkenyl group substituents was heated with glycerol and a mixture of $C_{20}$ and $C_{22}$ n-alkyl carboxylic acids, all the reactants being in equimolar quantities. The reaction mixture was heated to 200° C. for 14 hours, and the resulting polyester had a molecular weight of 2850.

0.3% by weight of this polyester was blended in each of two fuel oils (A) and (B). Fuel oil (A) contained 32% by weight of distillate fraction boiling between 350° and 680° F., and 68% by weight of residua with a boiling point of 680° F. plus. This fuel had a kinematic viscosity of 43.2 cs. at 100° F. Fuel oil (B) had an initial boiling point of 305° F. with 70% by weight boiling above 500° F. and a kinematic viscosity of 58.6 cs. at 100° F. With fuel oil (A) the flow point was reduced from 65° to 25° F. and with fuel oil (B) from 25° to −10° F. The flow point was determined using Admiralty Method VII as described in DEF–2406 of July 10, 1958. Flow point although higher than pour point measures substantially the same physical property, and a reduction in flow point is accompanied by a reduction in pour point, (usually a greater reduction in pour point).

Example II

Succinic anhydride having a mixture of $C_{18}$ to $C_{44}$ alkenyl group substituents was heated with diethanolamine and a mixture of $C_{20}$ and $C_{22}$ n-alkyl carboxylic acids, all the reactants being in equimolar quantities. The reaction mixture was heated to 200° C. for 6 hours.

0.3% by weight of this polymer was blended in each of the two fuel oils (A) and (B) described in Example I. With fuel oil (A) and the flow point was reduced from 65° to 15° F. and with fuel oil (B) from 25% to −25° F. When 0.1% by weight of the polymer was blended into fuel oils (A) and (B) the flow points were reduced from 65° C. to 20° F. and from 25° F. to −20° F. respectively.

What is claimed is:
1. An oil composition comprising a major proportion of a residual fuel oil, containing as a flow improver, about .001 to 10 wt. percent, based on the weight of said oil, of a polymer of about 1,000 to 5,000 molecular weight selected from the group consisting of acylated: polyesters, polyester-amides and polyamides, prepared by a condensation reaction of the following reactants:
   (1) an acid material selected from the group consisting of aliphatic dicarboxylic acid having a carbon chain of 2 to 6 carbon atoms linking the carboxylic acid groups, anhydride thereof, and esters of said acid or anhydride with $C_1$ to $C_5$ aliphatic alcohol, said acid material consisting only of carbon, hydrogen and oxygen, and having a $C_{18}$ to $C_{44}$ straight chain hydrocarbyl group attached to the carbon chain linking the two carboxylic groups,
   (2) a basic material selected from the group consisting of alcohol, amines, and hydroxy amines, said basic material consisting of hydrocarbyl with alcohol, or amine, or hydroxy amine groups, said basic material having at least three hydroxy or amine groups capable of undergoing a condensation reaction, and
   (3) a monocarboxylic acid of the formula:

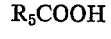

wherein $R_5$ is a $C_{12}$ to $C_{30}$ hydrocarbon group.
2. A composition as claimed in claim 1, wherein reactant (1) is a selected from the group consisting a hydrocarbyl substituted succinic acid and anhydride thereof.
3. A composition as claimed in claim 2, wherein the hydrocarbyl group of said acid material is an alkenyl group.
4. A composition as claimed in claim 3, wherein the hydrocarbyl group of said acid material contains about 30 carbon atoms.

5. A composition as claimed in claim 1, wherein reactant (2) is an aliphatic compound.

6. A composition as claimed in claim 5, wherein reactant (2) is a triol.

7. A composition as claimed in claim 6, wherein reactant (2) is glycerol.

8. A composition as claimed in claim 1, wherein reactant (2) is a secondary amine.

9. A composition as claimed in claim 8, wherein reactant (2) is a hydroxy secondary amine.

10. A composition as claimed in claim 9 wherein the hydroxy secondary amine is selected from the group consisting of diethanolamine and dipropanolamine.

11. A composition as claimed in claim 1, wherein reactant (2) is a trialkanolamine.

12. A composition as claimed in claim 1, wherein reactant (3) is an acid of the formula $R_5COOH$, $R_5$ being an alkyl group.

13. A composition as claimed in claim 1, wherein reactant (1) is an ester.

References Cited

UNITED STATES PATENTS

| | | | |
|---|---|---|---|
| 2,568,876 | 9/1951 | White et al. | 44—66 XR |
| 2,638,449 | 5/1953 | White et al. | |
| 2,744,071 | 5/1956 | Hollyday. | |
| 2,831,813 | 4/1958 | Matuszak et al. | |
| 2,944,025 | 7/1960 | Verdol. | |
| 2,993,773 | 7/1961 | Stromberg. | |
| 3,216,936 | 11/1965 | Le Suer. | |
| 3,240,575 | 3/1966 | Miller et al. | 44—66 |
| 3,287,271 | 11/1966 | Stuart et al. | |
| 3,324,033 | 6/1967 | Knapp. | |
| 3,331,776 | 7/1967 | Krukziener. | |

DANIEL E. WYMAN, *Primary Examiner.*

W. J. SHINE, *Assistant Examiner.*

U.S. Cl. X.R.

44—70, 71